United States Patent [19]
Bellak

[11] Patent Number: 5,852,936
[45] Date of Patent: Dec. 29, 1998

[54] PRESSURE MEDIUM ACTUATED OPERATING DEVICE

[75] Inventor: Gabor Bellak, Gothenburg, Sweden

[73] Assignee: AB Volvo, Gothenburg, Sweden

[21] Appl. No.: 849,850

[22] PCT Filed: Dec. 12, 1995

[86] PCT No.: PCT/SE95/01498

§ 371 Date: Jul. 10, 1997

§ 102(e) Date: Jul. 10, 1997

[87] PCT Pub. No.: WO96/18517

PCT Pub. Date: Jun. 20, 1996

[30] Foreign Application Priority Data

Dec. 13, 1994 [SE] Sweden .................................. 9404346

[51] Int. Cl.[6] .................................................. B60T 17/22
[52] U.S. Cl. ................................... 60/534; 92/5 R; 92/65
[58] Field of Search ............................ 60/534, 579; 91/1; 92/5 R, 5 L, 65

[56] References Cited

U.S. PATENT DOCUMENTS 3,654,549  4/1972  Maurer et al. ............................. 92/5 R
4,585,207  4/1986  Shelton ....................................... 92/65
4,656,457  4/1987  Brausfeld et al. ......................... 92/5 R
4,745,999  5/1988  Brugger et al. .

FOREIGN PATENT DOCUMENTS 0 158 004  10/1985  European Pat. Off. .
32 06 740   9/1983  Germany .

*Primary Examiner*—F. Daniel Lopez
*Attorney, Agent, or Firm*—Young & Thompson

[57] ABSTRACT

Pressure medium actuated control cylinder for wear compensation. A cylinder chamber includes two displaceable pistons. One piston has a first piston rod which extends outside the cylinder, and a second piston rod which extends into a through-bore in the second piston. The second piston rod has a bore, into which a rod-shaped resistor extends and penetrates an annular current collector fixed in the bore. The resistor and the current collector form a position sensor in the form of a linear potentiometer which indicates the position of the piston in the cylinder.

9 Claims, 1 Drawing Sheet

PRESSURE MEDIUM ACTUATED OPERATING DEVICE

BACKGROUND OF THE INVENTION

The present invention relates to a pressure medium actuated control device, comprising a cylinder with a cylinder chamber, at least first and second piston elements displaceable relative to each other in the cylinder chamber, a first piston rod which is joined to the first piston element and which protrudes out of the cylinder chamber, and a pressure medium reservoir opening into a portion of the cylinder chamber located between the piston elements, the second piston element having an end portion sealing against the cylindrical wall of the cylinder chamber with an end edge which, in a rest position of the piston element, permits communication between the reservoir and the cylinder chamber and which, after initial movement of the second piston element, breaks said communication to enclose a pressure medium volume between the piston elements.

Control cylinders of the above described type are used for various applications where there is a need for automatic compensation for changes in the stroke of the control cylinder piston rod. One example of such an application is the control cylinder in a friction clutch between a vehicle engine and a transmission, where the length of travel of the clutch pressure plate must compensate for the wear on the friction disc and the pressure plate so that the clutch will not begin to slip after a certain amount of wear. This means that the piston joined to the piston rod must be allowed to back into the cylinder as the disc is worn to thereby allow the pressure plate to advance a distance corresponding to the wear. This occurs automatically by virtue of the fact that pressure medium in the space between the pistons is able to drain into the reservoir as the wear takes place.

In certain applications there is a need to receive continuous information concerning the position of a first piston element relative to the cylinder. This can be achieved with various different known types of position sensors placed at suitable locations outside the cylinder to sense the position of some part of the piston rod projecting outside the cylinder or of some link or lever attached thereto.

SUMMARY OF THE INVENTION

The purpose of the present invention is in general to achieve a control cylinder with a compensation function of the type described by way of introduction, in which a position sensor is integrated so as to eliminate the need for a separate position sensor placed outside the cylinder or at an unsuitable location outside the cylinder. A particular purpose is to achieve a control device of this type which is particularly suited for use in operation of a vehicle clutch.

This is achieved according to the invention by virtue of the fact that the first piston element is joined to a second piston rod, which is directed oppositely to the first piston rod and sealingly projects into a through-bore in the second piston element, and that a position sensor is arranged to sense the position of the first piston element relative to the cylinder, said sensor comprising a first sensor element in the form of an elongated body which extends past the distal end of the second piston rod and parallel therewith and cooperates with a second sensor element, one of said sensor elements being fixed relative to the cylinder while the other of said sensor elements is fixed relative to the second piston rod.

The design according to the invention provides a control cylinder with a position sensor function, in which the position sensor is entirely integrated in the cylinder and is therefore not affected by the external conditions at the mounting location of the control cylinder. The sensor is also completely protected against external damage.

The control cylinder according to the invention is particularly suited for use as a "flange-mounted" clutch cylinder in vehicles, i.e. in an installation where the cylinder has a front flange which is screwed directly to the clutch housing and where the piston rod is not accessible from outside.

In one embodiment, the position sensor can be a linear potentiometer with a resistor in the shape of a rod, which is fixed centrally to the rear end wall of the cylinder and extends through an annular current collector in the bore of the second piston. Such an arrangement is simple and inexpensive, is easily accessible and permits easy wiring.

DESCRIPTION OF THE DRAWINGS

The invention will be described in more detail below with reference to the examples shown in the accompanying drawings, where the FIG. 1 shows a longitudinal section through an embodiment of a control cylinder according to the cylinder either inside or outside, the end piece as indicated by the phantom lines.

DESCRIPTION OF THE PREFERRED EMBODIMENTS

Figure 1:
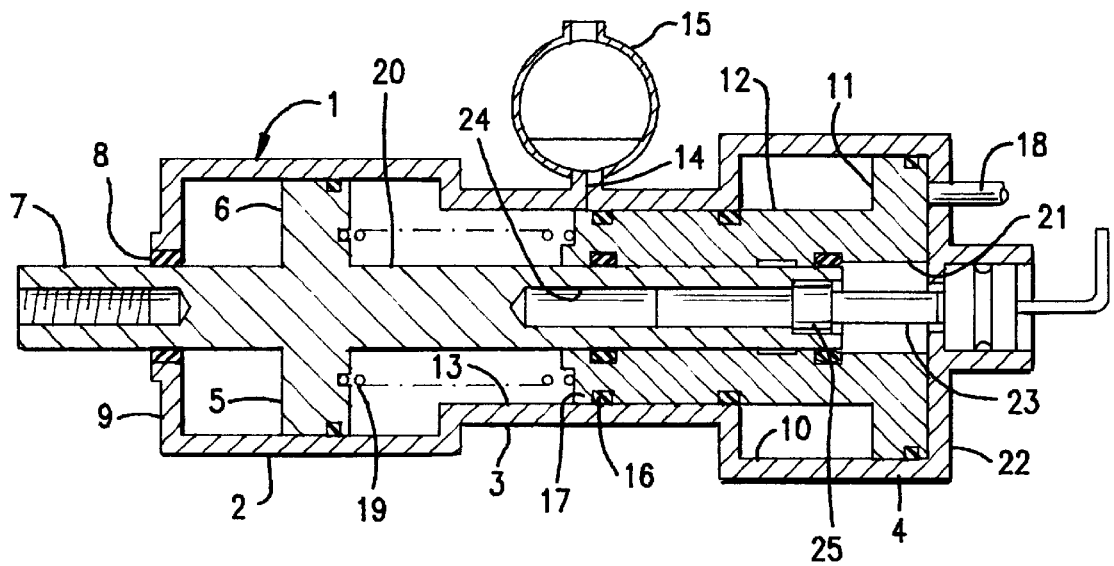

In FIG. 1 generally designates a cylinder, which is divided into three portions 2, 3 and 4, which, in the example shown, have different diameters. In the cylinder chamber 5 of the first cylinder portion 2, a first piston element 6 is displaceable. The piston element 6 is made with a first piston rod 7, which extends through a sealed opening 8 in one end wall 9 of the cylinder 1, and said piston rod 7 is intended to be connected to the device to be controlled, for example a disengaging arm (not shown) in a vehicle clutch. In the cylinder chamber 10 of the cylinder portion 4, which has a somewhat larger diameter than the cylinder chamber 5, a second piston element 11 is displaceable. The piston element 11 has a portion 12 of reduced diameter which extends into the cylinder chamber 13 of the cylinder portion 3, into which cylinder chamber a channel 14 opens from a hydraulic fluid reservoir 15. In the rear piston rest position shown in the Figure, a seal 16 rests at the end portion 17 of the piston portion 12 immediately to the right of the channel 14, so that hydraulic fluid can flow freely from the reservoir 15 to the cylinder chamber 13 and return. When the pressure medium, for example compressed air, is introduced through an inlet 18 into the cylinder chamber 10, the channel 14 is already blocked by the initial displacement of the piston 11. The enclosed volume of fluid between the piston elements 6 and 11 now transmits the movement of the piston element 11 to the piston element 6. By adapting the piston areas to each other, a suitable hydraulic ratio between the piston elements can be obtained.

When the cylinder chamber 10 is drained, the disengaging arm of the clutch pushes the piston rod 7 with the piston element 6 back to the right in the figure, and the enclosed volume as well as an intermediate spring 19 press the piston element 11 back to its original position shown in the figure. This exposes the channel 14, and the piston element 6 stays at a position which is dependent of how worn the clutch discs and pressure plate are. The greater the wear is, the farther to the right in the figure the piston element 6 will come to rest. As the wear increases, fluid will consequently flow out from the cylinder chamber 13 into the reservoir 15.

According to the invention, the piston element 6 is joined to a second piston rod 20, which extends into a through-bore 21 in the piston element 11. A position sensor for indicating the position of the piston element 6 in the cylinder chamber 5 comprises, firstly, a rod 23 fixed in the righthand end piece 22 of the cylinder 1, said rod 23 being an electrical resistor extending into a bore 24 in the piston rod 20, and, secondly, an annular body 25 fixed in the bore 24, said annular body being a current collector. The rod 23 and the ring 25 form a linear potentiometer, the resistance of which thus varies with the position of the piston element 6 in the cylinder 1.

Figure 2:
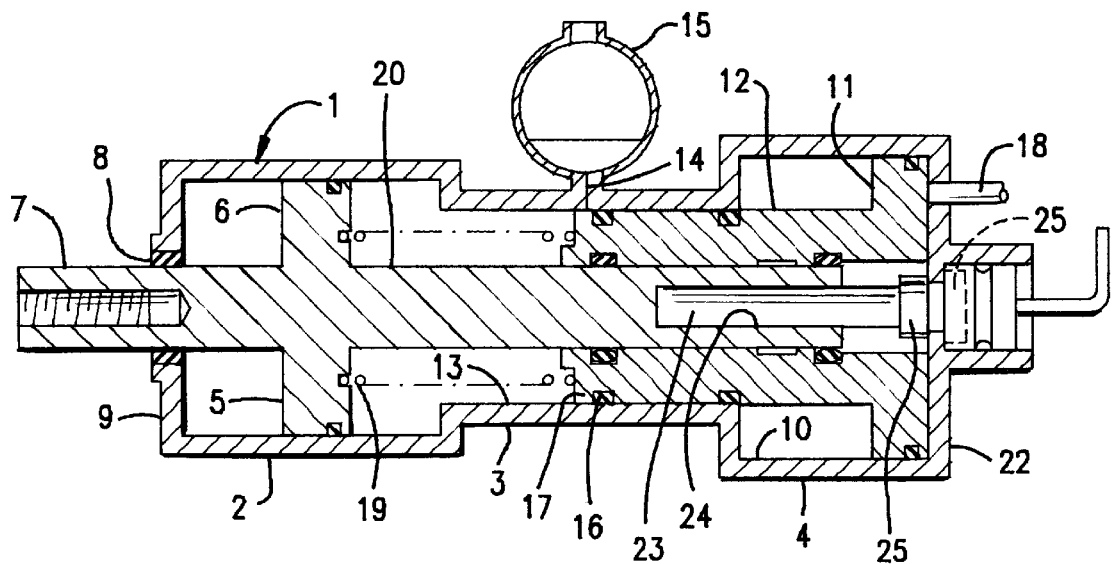

In an alternative embodiment illustrated in FIG. 2, the rod 23 can be fixed in the bore 24, and the ring 25 can be fixed in the righthand end piece 22 of the, cylinder either inside or outside the end piece as indicated by the phantom lines. In a further alternative embodiment, the rod 23, which is fixed in the bore 24, can transmit the movement/position to a position sensor placed outside the cylinder 1 to the right of its righthand end piece 22. In various embodiments, the position sensor can be placed both within and outside the pressurized volume.

In an automatic clutch, the signal from the position sensor 23,25, which represents both the clutch wear and the clutch movement, can be used to adapt the engagement and disengagement in such a manner that they always occur correctly regardless of the clutch wear.

A control cylinder of the type described above can of course also be used for other purposes, where one has need of being able to continuously monitor the position of a piston in a cylinder and at the same time compensate for wear. As alternatives to a linear potentiometer, an inductive sensor can be used consisting of a rod of ferromagnetic material and a coil.

I claim:

1. Pressure medium actuated control device, comprising a cylinder with a cylinder chamber, at least first and second piston elements displaceable relative to each other in the cylinder chamber, a first piston rod which is joined to the first piston element and which protrudes out of the cylinder chamber, and a pressure medium reservoir opening into a portion of the cylinder chamber located between the piston elements, the second piston element having an end portion sealing against a wall of the cylinder chamber which, in a rest position of the piston element, permits communication between the reservior and the cylinder chamber and which, after initial movement of the second piston element, breaks said communication to enclose a pressure medium volume between the piston elements, wherein the first piston element (6) is joined to a second piston rod (20), which is totally within the cylinder chamber and directed oppositely to the first piston rod (7) and sealing projects into a through-bore (21) in the second piston element (11), and wherein a position sensor (23,25) is arranged to sense the position of the first piston element (6) relative to the cylinder (1), said sensor comprising a first sensor element in the form of an elongated body (23) which extends past the distal end of the second piston rod and parellel therewith and cooperates with a second sensor element (25), one said sensor elements being fixed relative to the cylinder while the other of said sensor elements is fixed relative to the second piston rod.

2. The control device according to claim 1, wherein the first sensor element is a rod (23) concentrically arranged in the cylinder (1), and the second sensor element (25) is an annular body (25) through which the rod (23) extends.

3. The control device according to claim 2, wherein the first sensor element (23) is fixed in the cylinder (4) and extends into a central bore (24) in the second piston rod (20), and that the second sensor element (25) is fixed in the central bore.

4. The control device according to claim 2, wherein the first sensor element (23) is fixed relative to the second piston rod (20) and the second sensor element (25) is fixed relative to the cylinder (4).

5. The control device according to claim 4, wherein the second sensor element (25) is internally fixed to an end face of the cylinder.

6. The control device according to claim 4, wherein the second sensor element (25) is externally fixed to an end face of the cylinder.

7. The control device according to claim 1, wherein the first and second sensor elements (23,25) constitute parts of a linear potentiometer.

8. The control device according to claim 1, wherein the first and second sensor elements (23,25) constitute parts of a linear inductive sensor.

9. Pressure medium actuated control device, comprising a cylinder with a cylinder chamber, at least first and second piston elements displaceable relative to each other in the cylinder chamber, a first piston rod which is joined to the first piston element and which protrudes out of the cylinder chamber, and a pressure medium reservoir opening into a portion of the cylinder chamber located between the piston elements, the second piston element having an end portion sealing against a wall of the cylinder chamber which, in a rest position of the piston element, permits communication between the reservoir and the cylinder chamber and which, after initial movement of the second piston element, breaks said communication to enclose a pressure medium volume between the piston elements, wherein the first piston element is joined to a second piston rod, which is totally within the cylinder chamber and directed oppositely to the first piston rod and sealingly projects into a through-bore in the second piston element, said second piston rod having an axial cavity in one end, and wherein a position sensor is arranged to sense the position of the first piston element relative to the cylinder, said sensor comprising an elongated electrical resistor which is fixed relative to the cylinder and extends into the axial cavity and past the one end of the second piston rod and an annular current collector which is fixed to the one end of the second piston rod and through which the elongated resistor extends.

* * * * *